INVENTOR.
JACQUES MOSIER
BY
John R. Faulkner
Glenn D. Arendsen
ATTORNEYS

United States Patent Office 3,543,039
Patented Nov. 24, 1970

3,543,039
DELAY CIRCUIT FOR ENGINE STARTER MOTOR
Jacques Mosier, Ypsilanti, Mich., assignor to Ford Motor Company, Dearborn, Mich., a corporation of Delaware
Filed July 26, 1968, Ser. No. 747,939
Int. Cl. F02n *11/00*
U.S. Cl. 290—38         3 Claims

ABSTRACT OF THE DISCLOSURE

A capacitor connected to the starter relay lead between a silicon controlled rectifier and the relay coil is charged whenever the starter relay is actuated. Transistorized circuitry utilizes the capacitor charge to hold the controlled rectifier in a nonconducting state for about four seconds following each starter actuation. Such circuitry can include a field effect transistor. The capacitor also can be charged by the engine alternator to prevent starter actuation while the engine is operating.

SUMMARY OF THE INVENTION

Engine ring gears and starter pinion gears can be damaged seriously by actuating the starter motor while the engine ring gear is still rotating. In the past, devices using the alternator or generator output have been utilized to prevent starter actuation while the engine is operating. Such devices necessitated interconnecting the alternator and the starter circuit and thereby increased assembly time and further complicated vehicle wiring. Moreover, the vast majority of damage incidents result when the vehicle operator attempts to reactuate the starter too quickly after the engine has failed to start on a previous actuation, and the virtually negligible alternator output under these conditions usually does not prevent the reactuation.

This invention provides a control circuit that is connected only to the starter motor circuit and provides a predetermined time period after each starter actuation during which the starter cannot be reactuated, thus positively preventing the most common method of damaging the engine. In a starter motor circuit having a starter actuating circuit coupled to a source of electrical energy through a manually operated switch, the delay circuit comprises a control element such as a solid state switch coupled to the starter actuating circuit. The control element has a conducting state and a nonconducting state and prevents starter actuation when in one of these states, usually the latter. A timing system turns on the control element automatically for each initial starter actuation, but switches the control element into its nonconducting state for a predetermined amount of time after a previous starter motor actuation.

A thyristor serves effectively as the solid state switch, and the timing system generally comprises a capacitor connected to the lead connecting the thyristor to the starter relay. When the starter relay is actuated, a charge builds up on the capacitor. Transistorized circuitry connected to the gate terminal of the thyristor utilizes the charge to hold off the thyristor until the capacitor charge is dissipated. A field effect transistor can be used to great advantage in the circuit connecting the capacitor to the gate terminal of the thyristor.

DETAILED DESCRIPTION

Figure 1:
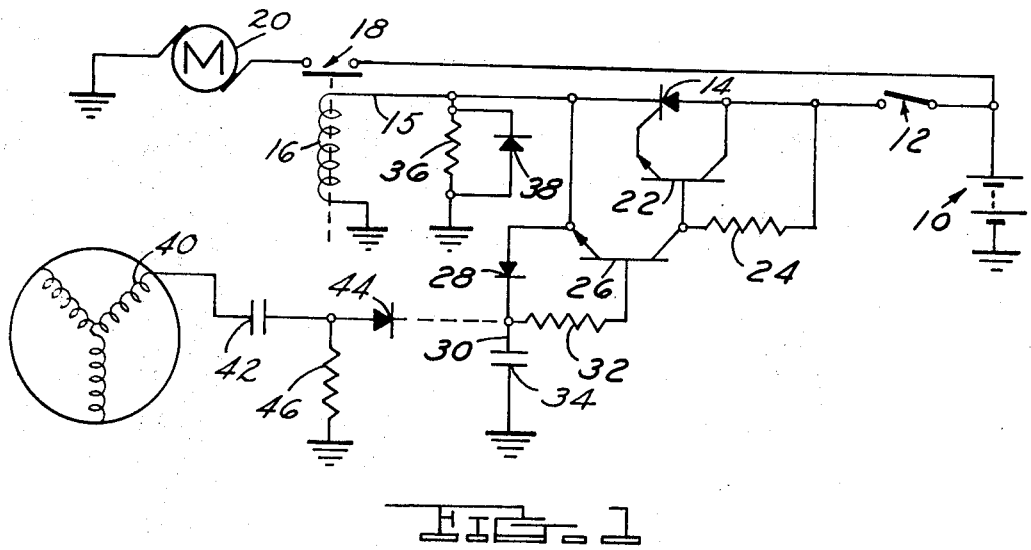
FIG. 1 shows a delay circuit using a silicon controlled rectifier as the control element with two transistors connecting the capacitor to the gate terminal thereof. Optional connection of the capacitor to an alternator to prevent actuation while the engine is operating also is shown in FIG. 1.

Referring to FIG. 1, a battery 10 has its positive terminal connected to a manually operated starting switch 12. Starting switch 12 generally is associated with the manually operated key switch of the vehicle. A silicon controlled rectifier 14, which serves as the control element, has its anode connected to switch 12 and its cathode connected to a lead 15. Lead 15 is connected to one side of a starter relay coil winding 16 that has its other side connected to the negative terminal of battery 10. In a parallel circuit, the positive terminal of battery 10 is connected through a switch 18 actuated by coil winding 16 to a starter motor 20.

The timing circuit consists of a first NPN type transistor 22 that has its collector connected to the anode of controlled rectifier 14 and its emitter connected to the gate terminal of controlled rectifier 14. The base terminal of transistor 22 is connected to the anode of controlled rectifier 14 by a resistor 24.

A second NPN type transistor 26 has its collector connected to the base of transistor 22 and its emitter connected to lead 15. The anode of a diode 28 is connected to lead 15 and the cathode thereof is connected to a lead 30. Lead 30 is connected through a resistor 32 to the base terminal of transistor 26 and through a capacitor 34 to the negative terminal of battery 10. Transient voltages induced by relay coil winding 16 are suppressed by connecting lead 15 to the negative terminal of the battery through a resistor 36 in parallel with a diode 38, the cathode of which is connected to lead 15.

With a conventional automotive-type 12-volt battery serving as battery 10, typical types and values of the components used in the FIG. 1 circuit are as follows: silicon controlled rectifier 14, type 2N4441; transistors 22 and 26, type 2N2924; resistor 24, 12K ohms; resistor 32, 15K ohms; resistor 36, 150 ohms; diodes 28 and 38, type 1N4001; and capacitor 34, 25 microfarads at 15 volts.

Prior to initial starter actuation, the cathode terminal of rectifier 14 and the base terminal of transistor 26 are at ground potential. Closing switch 12 applies battery potential to the anode of controlled rectifier 14 and to the collector of transistor 22. Resistor 24 applies a potential slightly below battery potential to the base of transistor 22 and transistor 22 turns on to apply a positive potential to the gate of controlled rectifier 14. This positive potential turns on controlled rectifier 14 and applies battery potential to lead 15 and coil winding 16. Electromagnetic forces produced in winding 16 close switch 18 to apply battery potential to starter motor 20 which cranks the engine.

Simultaneously, forward biased diode 28 applies the positive potential existing in lead 15 to capacitor 34, thereby forming a positive charge on lead 30. Transistor 26, which initially is turned off, may be forward biased by the positive potential building up in lead 30. Transistor 22 is not necessarily turned off thereby because the potential at the emitter of transistor 26 is high; even if transistor 22 turned off, controlled rectifier 14 would remain on.

If the engine fails to start, the operator deactuates starting switch 12 and the collapsing field of coil 16 commutates rectifier 14. The voltage in lead 15 falls to ground potential and the positive voltage on capacitor 34 applied through resistor 32 to the base of transistor 26 maintains transistor 26 in a forward biased condition. The charge on capacitor 34 dissipates slowly through reverse biased diode 28 and through the series connections of resistor 32 and the base-emitter terminals of transistor 26. If the starting switch is reactuated before the charge on capacitor 34 has dissipated sufficiently, transistor 26 turns on to hold the base of transistor 22 at a low potential. Transistor 22 then remains off and controlled rectifier 14 is not triggered, thereby blocking the flow of current from battery 10 through relay winding 16. About four seconds of delay usually permits the ring gear and starter motor pinion gear to stop completely and a delay of about this amount is provided by the components listed above. Starting switch 12 can be held closed during the delay period and rectifier 14 will trigger as soon as the dissipated charge turns off transistor 26, which in turn turns on transistor 22. Despite a failure of many of the components in the timing circuit, the control circuit will permit normal operation of the starter actuating circuit since the controlled rectifier tends to switch automatically to its conducting state.

Starter actuation can be prevented whenever the engine is operating and for four seconds after significant operation ceases by connecting the alternator stator winding 40 through a capacitor 42 and a diode 44 to lead 30. The cathode of diode 44 is connected to lead 30, and a resistor 46 connects the anode of diode 44 to the negative terminal of battery 10. Alternator operation produces a positive potential at the anode of diode 44 which transmits that potential to capacitor 34. Transistor 26 is forward biased by the potential and prevents triggering of controlled rectifier 14 in the manner described above. When the alternator stops rotating, the charge on capacitor 34 dissipates sufficiently in about four seconds to permit triggering the controlled rectifier 14. Capacitor 42 typically is 100 microfarads at 25 volts, diode 44 is type 1N4001, and resistor 46 is 1000 ohms.

Figure 3:
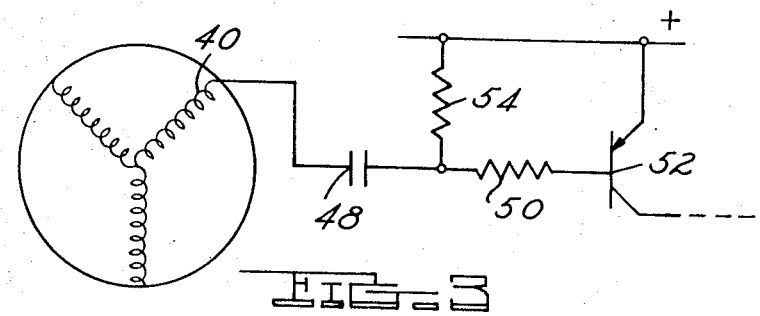
FIG. 3 shows an amplifying circuit for increasing the signal from the optional alternator addition of FIG. 1.

The signal from the alternator stator winding 40 can be amplified by the circuit shown in FIG. 3. Stator winding 40 is connected to a capacitor 48, and capacitor 48 is connected through a resistor 50 to the base of a PNP-type transistor 52. A resistor 54 connects the positive terminal of battery 10 to the lead connecting capacitor 48 to resistor 50. The emitter of transistor 52 also is connected to the positive terminal of battery 10 and the collector is connected to lead 30 in FIG. 1. Capacitor 48 typically is 25 microfarads at 25 volts, resistor 50 is 5000 ohms, transistor 52 is type 2N3638, and resistor 54 is 1000 ohms.

Figure 2:
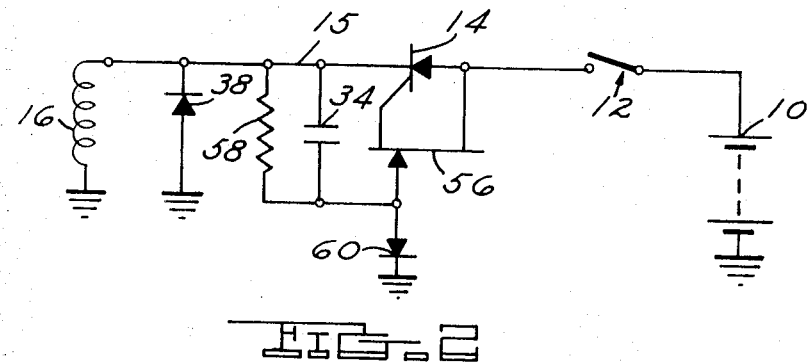
FIG. 2 shows a circuit utilizing a silicon controlled rectifier and a field effect transistor.

The use of a field effect transistor simplifies the timing circuitry controlling the controlled rectifier 14. Referring to FIG. 2, the drain terminal of a field effect transistor 56 is connected to the anode of controlled rectifier 14 and the source terminal of transistor 56 is connected to the gate of rectifier 14. Capacitor 34 in parallel with a resistor 58 connects lead 15 to the gate terminal of transistor 56. A diode 60 has its anode connected to the gate terminal of transistor 56 and its cathode connected to the negative terminal of battery 10. Transistor 56 typically is type 2N4392, resistor 58 is 15K ohms, and diode 60 is type 1N4001.

Transistor 56 has P-type gate material and is normally in a conducting state. The initial actuation of switch 12 applies a positive voltage to the gate of controlled rectifier 14 that triggers rectifier 14 and applies current to coil winding 16. A positive charge builds up on the plate of capacitor 34 connected to lead 15 and diode 60 transmits a corresponding negative charge to the other capacitor plate. This negative charge is applied to the gate of transistor 56 to pinch off conduction of the transistor.

Opening switch 12 drops the voltage in lead 15 to ground and commutates rectifier 14. The negative charge on the lower plate of capacitor 34 holds transistor 56 off and begins dissipating through resistor 58. Until the charge has dissipated sufficiently, transistor 56 remains in a nonconducting state so closing switch 12 will not turn on controlled rectifier 14.

Thus this invention provides an inexpensive control circuit for preventing starter reactuation for a predetermined time period. The circuit is designed so failure of components in the timing system usually does not prevent normal starter actuation. A transistor can be used as the control element in place of silicon controlled rectifier 14 if desired, although the ruggedness and temperature charactesistics of the silicon controlled rectifier render it particularly suitable for the engine compartment. The values of the capacitor and associated elements can be modified as desired to achieve any predetermined delay. Circuitry is simplified by the use of a field effect transistor to control conduction of the control element.

What is claimed is:

1. In a control circuit for an electrical starter motor of an engine, said circuit having a source of electrical energy, a manually operated switch, and a starter actuating circuit coupled to said source of electrical energy through said manually operated switch, a delay circuit comprising control means including a solid state, controlled switch coupled to said starter actuating circuit, said controlled switch having a gate terminal and having its input-output terminals in series with said battery and said manually operated switch, said controlled switch having a conducting state and a nonconducting state, said control means permitting completion of the starter actuation circuit when the controlled switch is in the conducting state and preventing completion of the starter actuating circuit when the switch is in the nonconducting state, and timing means coupled to said control means for switching the controlled switch into the nonconducting state for a predetermined amount of time after a previous starter motor actuation, said timing means including a diode having its anode connected to the output terminal of said controlled switch and its cathode connected through a capacitor to ground, a first transistor having its output terminal connected to said gate terminal, its input terminal connected to the source of electrical energy, and its base terminal connected through a resistance to the source of electrical energy, and a second transistor having its input terminal connected to the base terminal of the first transistor, its output terminal connected to the output terminal of said controlled, switch and its base terminal connected through a resistance to the cathode of said diode, said capacitor receiving a charge during each starter actuation, said charge acting on said second transistor to turn off said first transistor until the charge has dissipated.

2. The control circuit of claim 1 comprising a rectifier having its anode connected to the stator winding of an alternator driven by the engine and its cathode connected to the cathode of said diode to prevent completion of the starting actuating circuit while the engine is running.

3. In a control circuit for an electrical starter motor of an engine, said circuit having a source of electrical energy, a manually operated switch, and a starter actuating circuit coupled to said source of electrical energy through said manually operated switch, a delay circuit comprising control means including a solid state, controlled switch coupled to said starter actuating circuit, said controlled switch having a gate terminal and having its input-output terminals in series with said battery and said manually operated switch, said controlled switch having a conducting state and a nonconducting state, said control means permitting completion of the starter actuating circut when the controlled switch is in the conducting state and preventing completion of the starter actuating circuit when the controlled switch is in the nonconducting state, and timing means coupled to said control means for switching the controlled switch into the state preventing completion of the starter actuating circuit for a predetermined amount of time after a previous starter motor actuation, said timing means including a field effect transistor having its drain terminal connected to the input terminal of the controlled switch, its source terminal connected to the gate terminal of the controlled switch and its gate terminal connected through a resistor in parallel with a capacitor to the output terminal of the controlled switch and a diode having its anode connected to the gate terminal of the field effect transistor and its cathode connected to ground, said field effect transistor being normally conducting, said capacitor receiving a charge during each starter actuation, said charge rendering said field effect transistor nonconducting until the charge has dissipated.

References Cited

UNITED STATES PATENTS

| 3,167,659 | 1/1965 | Cromwell | 290—38 |
| 3,264,484 | 8/1966 | Keuchen | 290—38 |
| 3,275,836 | 9/1966 | Vancha | 290—38 |
| 3,325,657 | 6/1967 | Corey | 290—38 XR |

GLEN R. SIMMONS, Primary Examiner

U.S. Cl. X.R.

123—179; 290—37